United States Patent
Freeman et al.

(10) Patent No.: US 6,402,039 B1
(45) Date of Patent: *Jun. 11, 2002

(54) FLEXIBLE CHIP CARD WITH DISPLAY

(75) Inventors: Gary A. Freeman, Newton, MA (US); David H. Freeman, Tampa, FL (US)

(73) Assignee: Viztec Inc., Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/420,087

(22) Filed: Oct. 18, 1999

Related U.S. Application Data

(63) Continuation of application No. 09/040,517, filed on Mar. 17, 1998, now Pat. No. 6,019,284, which is a continuation-in-part of application No. 09/014,055, filed on Jan. 27, 1998, now abandoned.

(51) Int. Cl.[7] .............................................. G06K 19/06
(52) U.S. Cl. ........................ 235/492; 235/375; 235/380
(58) Field of Search ................................ 235/380, 375, 235/492, 457

(56) References Cited

U.S. PATENT DOCUMENTS

| | | | |
|---|---|---|---|
| 4,380,699 A | 4/1983 | Monnier et al. ............. 235/492 |
| 4,558,427 A | 12/1985 | Takeuchi et al. ............. 364/708 |
| 4,670,664 A | 6/1987 | Hara ............................ 307/150 |
| 4,677,657 A | 6/1987 | Nagata et al. ................. 55/90 |
| 4,692,601 A | 9/1987 | Nakano ....................... 235/380 |
| 4,704,003 A | * 11/1987 | Komaki ....................... 350/344 |
| 4,746,787 A | 5/1988 | Suto et al. .................... 235/379 |
| 4,749,982 A | 6/1988 | Rikuna et al. ............ 340/146.2 |
| 4,754,418 A | 6/1988 | Hara ............................ 364/708 |
| 4,797,542 A | 1/1989 | Hara ............................ 235/380 |
| 4,868,376 A | 9/1989 | Lessin et al. ................. 235/492 |
| 4,876,441 A | 10/1989 | Hara et al. .................. 235/488 |
| D305,023 S | 12/1989 | Suto .......................... D14/117 |
| 4,918,631 A | 4/1990 | Hara et al. .................. 364/708 |
| 4,954,985 A | 9/1990 | Yamazaki et al. .......... 365/108 |
| 5,055,968 A | 10/1991 | Nishi et al. .................. 361/395 |

(List continued on next page.)

FOREIGN PATENT DOCUMENTS

FR     2731537 A    * 7/1995

OTHER PUBLICATIONS

Doane et al., "Reflective Cholesteric Liquid–Crystal Displays," Information Display (Dec. 1996).

Merkert, "The Scoop on Chips," Moneycard Collector (Jan. 27, 1998).

Yaniv, "Reflective Cholesteric Displays," Information Display (Oct. 1995).

Yuan, "Bistable Reflective Cholesteric Displays," (article –no publication name)* month & year missing.

(List continued on next page.)

*Primary Examiner*—Michael G. Lee
*Assistant Examiner*—Allyson Sanders
(74) *Attorney, Agent, or Firm*—Fish & Richardson P.C.

(57) ABSTRACT

A chip card including a flexible body; at least one semiconductor chip supported within the flexible body and comprising a memory for storing the information; a display element capable of displaying at least a portion of the information stored in the semiconductor chip, the display element being supported within the flexible body and comprising display areas viewable from at least one side of the chip card; circuitry for controlling the display element; the chip card being capable of undergoing flexing of the type and magnitude experienced by a card during normal use, handling, and storage (e.g., storage in a pocket, wallet, or purse) without permanent damage to the display element and without permanent loss of the displayed information. A chip card may include a power source to provide multi-media capabilities by driving a speaker/microphone or showing a series of images to produce an animated display or film clip.

3 Claims, 10 Drawing Sheets

U.S. PATENT DOCUMENTS

| | | | | |
|---|---|---|---|---|
| 5,142,510 A | | 8/1992 | Rodda | 367/163 |
| 5,146,068 A | | 9/1992 | Ugawa et al. | 235/441 |
| 5,276,311 A | | 1/1994 | Hennige | 235/380 |
| 5,315,377 A | | 5/1994 | Isono et al. | 348/31 |
| 5,359,183 A | | 10/1994 | Skodlar | 235/493 |
| 5,380,991 A | | 1/1995 | Valencia et al. | 235/383 |
| 5,477,038 A | | 12/1995 | Levine et al. | 235/380 |
| 5,517,011 A | | 5/1996 | Vandenengel | 235/441 |
| 5,537,314 A | | 7/1996 | Kanter | 364/406 |
| 5,558,957 A | | 9/1996 | Datta et al. | 429/127 |
| 5,590,038 A | | 12/1996 | Pitroda | 395/241 |
| 5,594,493 A | | 1/1997 | Nemirofsky | 348/13 |
| 5,625,477 A | | 4/1997 | Wu et al. | 349/35 |
| 5,636,044 A | | 6/1997 | Yuan et al. | 349/142 |
| 5,638,194 A | | 6/1997 | Yamada et al. | 349/86 |
| 5,682,294 A | | 10/1997 | Horejs, Jr. et al. | 361/737 |
| 5,693,956 A | | 12/1997 | Shi et al. | 257/40 |
| 5,703,755 A | | 12/1997 | Flesher et al. | 361/737 |
| 5,727,153 A | | 3/1998 | Powell | 395/492 |
| 5,734,154 A | * | 3/1998 | Jachimowicz et al. | 235/492 |
| 5,767,896 A | * | 6/1998 | Nemirofsky | 348/13 |
| 5,770,849 A | | 6/1998 | Novis et al. | 235/492 |
| 5,777,903 A | * | 7/1998 | Piosenka et al. | 235/380 X |
| 5,789,732 A | | 8/1998 | McMahon et al. | 235/487 |
| 5,794,210 A | | 8/1998 | Goldhaber et al. | 705/14 |
| 5,804,806 A | | 9/1998 | Haddad et al. | 235/383 |
| 5,806,044 A | | 9/1998 | Powell | 705/14 |
| 5,806,045 A | | 9/1998 | Biorge et al. | 705/14 |
| 5,816,918 A | | 10/1998 | Kelly et al. | 463/16 |
| 5,880,769 A | | 3/1999 | Nemirofsky et al. | 348/12 |
| 5,884,271 A | | 3/1999 | Pitroda | 701/1 |
| 5,884,278 A | | 3/1999 | Powell | 705/14 |
| 5,887,271 A | | 3/1999 | Powell | 705/14 |
| 5,890,135 A | | 3/1999 | Powell | 705/14 |
| 5,907,831 A | | 5/1999 | Lotvin et al. | 705/14 |
| 5,924,078 A | | 7/1999 | Naftzger | 705/16 |
| 5,950,173 A | | 9/1999 | Perkowski | 705/26 |
| 5,955,961 A | | 9/1999 | Wallerstein | 340/825.33 |
| 5,956,694 A | | 9/1999 | Powell | 705/14 |
| 5,983,200 A | | 11/1999 | Slotznick | 705/26 |
| 5,987,132 A | | 11/1999 | Rowney | 380/24 |
| 5,992,888 A | | 11/1999 | North et al. | 283/56 |
| 5,999,908 A | | 12/1999 | Abelow | 705/1 |
| 6,012,038 A | | 1/2000 | Powell | 705/14 |
| 6,050,494 A | | 4/2000 | Song et al. | 235/492 |
| 6,055,509 A | | 4/2000 | Powell | 705/14 |
| 6,067,526 A | | 5/2000 | Powell | 705/14 |
| 6,068,183 A | | 5/2000 | Freeman et al. | 235/375 |
| 6,101,477 A | | 8/2000 | Hohle et al. | 705/1 |
| 6,105,002 A | | 8/2000 | Powell | 705/14 |
| 6,112,988 A | | 9/2000 | Powell | 235/383 |
| 6,178,407 B1 | | 1/2001 | Lotvin et al. | 705/14 |

OTHER PUBLICATIONS

"Polymer–dispersed LCDs," printed from Internet on Sep. 17, 1997, *http://stephan.wwwmedia.mit.edu/people/stefan/liquid–crystals/node9.html*.

"Ferroelectric LCDs," printed from Internet on Sep. 14, 1997, published Jun. 1992, HTML: Aug. 30, 1995, filed:///C/My Documents/Gary/smart card/ferro_1.htm.

"A contactless multiservice system —Technology transfer," Innovation Industries/Roland Moreno Technology, product new release, Paris, France, 3 pages (1997) * month missing.

Bakke, "Cram a walletful of information into one Card with a brain; computerized credit cards," Popular Science, Times Mirror Magazines Inc. (Jul. 1983).

Charlish, "US and Japan Step Smartly Ahead," The Financial Times Limited (Nov. 12, 1986).

Frenkel, "Smart cards, dumb problems," Forbes, Inc. (Nov. 5, 1984).

Kutler, "Thomas Cook to Use Smart Card Technology; UltiCards are Called First to Combine Travel and Financial Services Functions," The American Banker (May 12, 1988).

Kutler, "'UltiCard' Developers Hope to Make Smart Card Debate Obsolete," The American Banker (Jul. 23, 1986).

PR Newswire (Oct. 13, 1986).

"The Calculator that could be a Credit Card," Business Week (Nov. 14, 1983).

Wellborn, "A microchip to bring plastic junkies to their kness; Raising the intelligence of credit cards," U.S. News & World Report (Feb. 2, 1987).

* cited by examiner

FLEXIBLE CHIP CARD WITH DISPLAY

This is a continuation of U.S. Pat. application Ser. No. 09/040,517, filed Mar. 17, 1998, now U.S. Pat. No. 6,019,284 which is a continuation-in-part of U.S. Pat. application Ser. No. 09/014,055, filed on Jan. 27, 1998, now abandoned, and incorporated by reference.

BACKGROUND OF THE INVENTION

The present invention relates to data or transaction cards containing semiconductor processors and/or memory chips.

Such cards are commonly referred to as chip cards (or smart cards). They are typically wallet-size and contain a microchip. Often, there are electrical contacts on the surface of the card through which communications are made between an external chip card device and the semiconductor chip, but there are also wireless chip cards in which communication is made using a wireless transceiver located within the card. Chip cards are now being used in numerous applications, including telecommunications, government benefits programs, health care, public transportation, universities, and vending machines.

One of the widespread uses of chip cards today is as a stored-value card, which contains monetary value in the microchip embedded in the card. For example, each time a consumer uses a chip card in a vending machine, the amount of the purchase is deducted from the cash balance stored in the microchip on the chip card. One application for such stored-value chip cards is eliminating the need for people to carry around small coins or bills and speed up the time it takes to consummate small cash transactions. However, current chip cards offer no built-in mechanism for viewing the cash balance remaining on the chip card. This reduces the convenience and ease of use of chip cards.

Initially, a consumer could only determine the cash balance on a chip card by taking the card to a vending machine, retail location, or other point of purchase equipped with a chip card reader. Several portable chip card readers were developed to provide chip card users with a convenient way to determine the cash balance on their chip cards.

Although these portable chip card reading devices, including the ones shown in U.S. Pat. No. 5,015,830 to Masuzawa and U.S. Pat. No. 5,517,011 to Vandenengel, make chip cards more convenient to use than without such devices, these chip card readers still suffer from numerous disadvantages. For example, some require battery replacement at regular intervals; some portable card readers are sealed units in which the batteries cannot be replaced, thus requiring the consumer to purchase a new card reader every time the batteries wear out. Many chip cards require their own specially programmed card reader; if a consumer has several types of chip cards in his or her wallet, they could also require several different chip card readers in their wallet, which would be bulky, inconvenient, and very impractical to use. Current chip card readers are inconvenient to use, as they either require the consumer to insert the chip card into the reader each time the consumer wants to check the balance, or the consumer must keep the chip card in the reader at all times, press a button to check the balance, and then remove the card from the reader in order to consummate a transaction. They require the consumer to carry a separate device, which can easily be lost or forgotten, leaving the consumer without any way to spontaneously determine the cash balance on the chip card. They are costly devices in relation to the total cost of manufacturing a chip card. It is easy to forget the cash balance on the chip card, which requires the consumer to frequently recheck the balance using the portable balance reader.

Displays have been suggested for data cards. U.S. Pat. No. 4,954,985 to Yamazaki discloses a card with a ferroelectric liquid crystal memory region and a ferroelectric liquid crystal display region. U.S. Pat. No. 4,746,787 to Suto discloses an IC Card with a display and an integrated circuit containing a processor and memory. Neither patent suggests a flexible display element or flexible card body. Yamazaki refers to using both Corning 7059 glass or plastic for the card body, without any indication that one is preferable to the other. Suto suggests plastic for the card substrate but the disclosed liquid crystal display would fracture if the card underwent flexing of the type and magnitude experienced by a card during normal use, handling, and storage (e.g., storage in a pocket, wallet, or purse).

In the case of chip cards used in applications other than stored-value, such as health care, currently available chip cards require the user to go to a location with a chip card reader in order to display information contained in the microchip on the card. If a health care chip card holder has a serious medical condition and is taking medication for that condition, an emergency caregiver must have access to a chip card reader to find out what medication the patient is taking or what medical condition the person has that could be critical in deciding what emergency treatment to give the patient. Today, many chip cards contain information that would be very valuable if it could be instantly accessed, but which loses its value once the card user has to search and take the time to find a chip card reader in order to access the information.

SUMMARY OF THE INVENTION

The invention provides a chip card with a practical, built-in display. The card can undergo flexing of the type and magnitude experienced by a card during normal use, handling, and storage (e.g., storage in a pocket, wallet, or purse) without permanent damage to the display element or permanent loss of the displayed information.

In general, the invention features a chip card including a flexible body; at least one semiconductor chip supported within the flexible body and comprising a memory for storing the information; a display element capable of displaying at least a portion of the information stored in the semiconductor chip, the display element being supported within the flexible body and comprising display areas viewable from at least one side of the chip card; circuitry for controlling the display element; the chip card being capable of undergoing flexing of the type and magnitude experienced by a card during normal use, handling, and storage (e.g., storage in a pocket, wallet, or purse) without permanent damage to the display element and without permanent loss of the displayed information.

One or more of the following features may be incorporated into embodiments of the invention: the display element, itself, can be made tolerant of such flexing, or the display can be located in an area of the chip card that does not undergo substantial flexing (e.g., a corner).

The display element may have the capability to continue displaying information after electrical power is removed from it. The display element may offer a multicolor display. The display element may offer stereoscopic effects, for example, by layering a barrier strip over the display element. Additionally, the card may feature multiple displays.

Contacts exposed on a surface of the card can be provided for establishing communication with the semiconductor chip. Alternatively, a wireless communication element can be provided within the card.

Internal connection elements may be provided for connecting the semiconductor chip to the display element. The internal connection elements are preferably configured to withstand flexing.

The flexible body may be constructed from various materials, including plastic, paper, reinforced paper, and cardboard. If from plastic, the material may include polyvinyl chloride, polyester, ABS, or polycarbonate.

A substantially transparent layer of protective plastic may be provided to cover the display areas of the display element.

An additional information storage medium (e.g., bar code symbol, magnetic stripe element) may be provided in addition to the semiconductor chip.

The card may include a power source. The power source may be replaceable and/or rechargeable. The card may provide a mechanism to conserve power (e.g., a kickstart circuit). The power source may provide multi-media features. For example, the power source may drive a speaker, a microphone, or cause the display element to produce a series of images (e.g., a video clip) on the display element. The power supply may also power communication elements in a contactless card.

The invention has numerous advantages. It avoids the need for external readers by providing a practical built-in display of information stored on a card that can undergo flexing. This allows users of the cards to carry and handle the cards as they would conventional chip cards lacking a display. When applied to stored value cards, the invention permits the user of a card to conveniently determine the cash balance with as little as a quick glance at the face of the card, similar to coins or paper money which have their value printed on their face. The display element can provide a display of information without the use of batteries or any other power source, thus reducing the long term costs to both the chip card manufacturer and consumer. Introduction of a flexible power source, however, can enhance the features provided by the card (e.g., multi-media capabilities). The invention greatly enhances the convenience, efficiency, and practicality of chip cards for their uses.

The invention provides advantages for a wide range of chip card applications. When used with a health care chip card, the invention will allow the cardholder's medical condition and medications to be displayed on the face of the card. If the medication or medical condition changes, the chip card reading/writing device at the pharmacy or doctors office would update the information shown on the display. In an emergency situation, the care giver would have instant knowledge of the patient's medical condition and medications, without having to take the time to locate and use an external card reading device.

Other features and advantages of the invention will be apparent from the following description of preferred embodiments and from the claims.

BRIEF DESCRIPTION OF THE CLAIMS

DESCRIPTION OF THE PREFERRED EMBODIMENTS

Figure 1A:
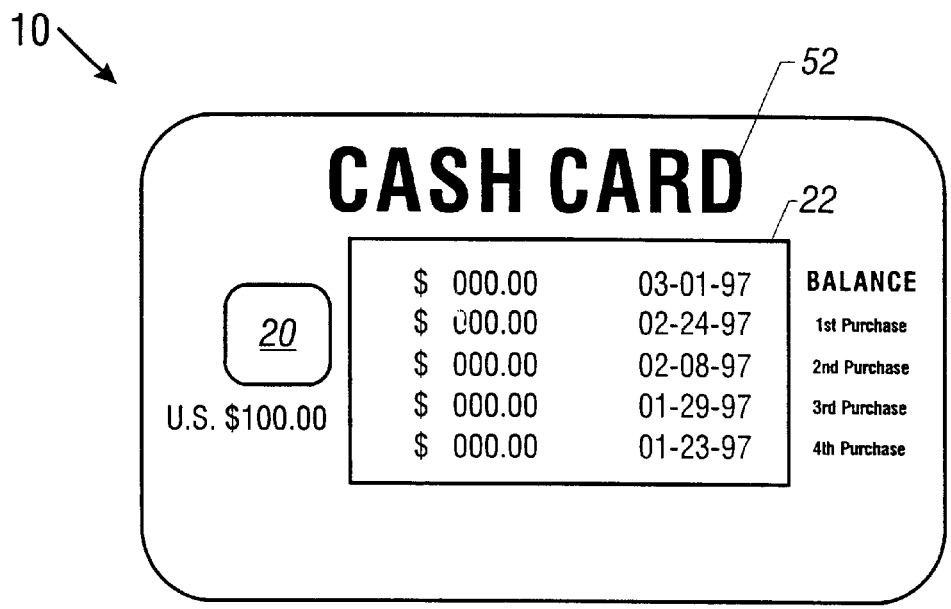
FIGS. 1A–1C show a contact-type chip card with a flexible display element, with the optional magnetic stripe and bar code on the reverse side of the card.
Figure 1B:
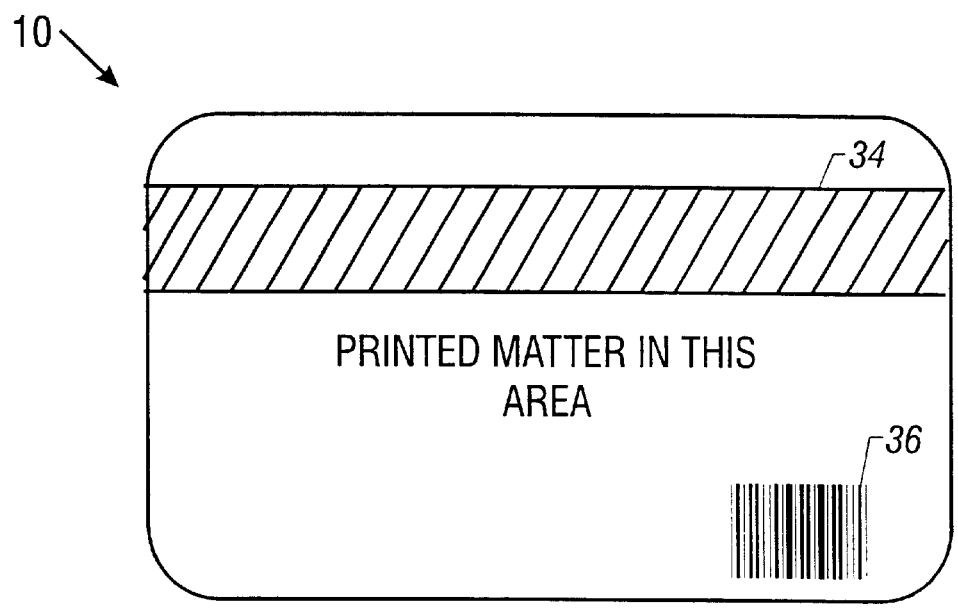
Figure 1C:
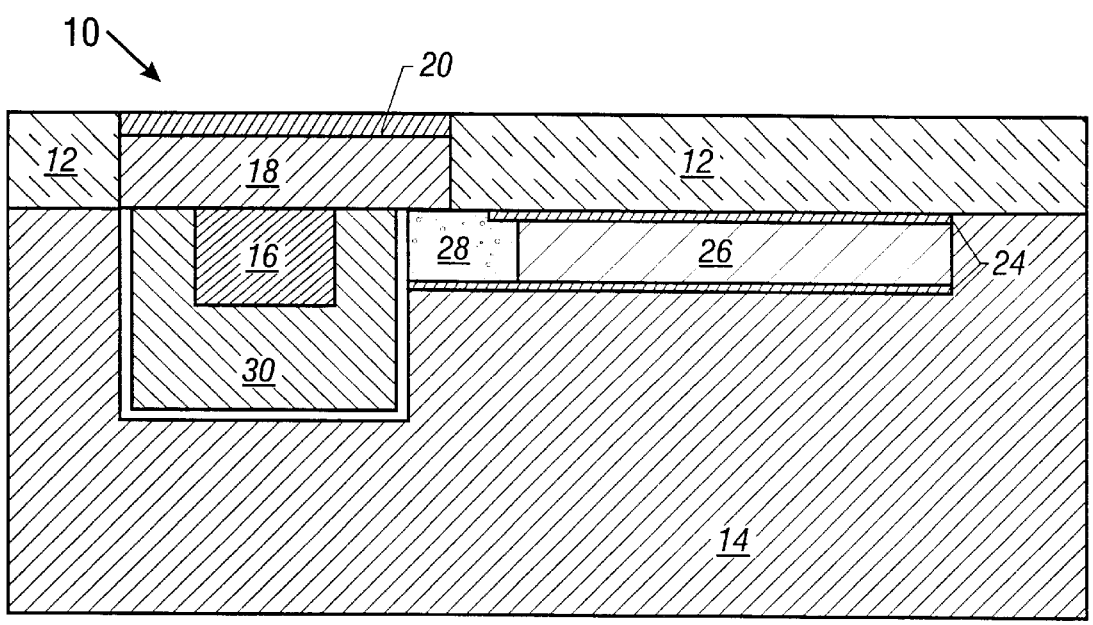

Turning to FIGS. 1A–1C, there is shown a chip card 10 having a transparent protective top layer 12 (PVC or other clear plastic) and transparent (or opaque or translucent) substrate 14 (PVC or other plastic). The top layer and substrate (body) may be molded or machined into the necessary shape to accommodate the internal components of the card. Indicia are printed on the top layer (e.g., on the interior surface), and a hologram (not shown in FIGS. 1A–1C; see 32 in FIG. 3) may be installed beneath the top layer (e.g., a rainbow hologram element as commonly used on credit cards). A conventional magnetic stripe 34 and signature panel can be provided on the bottom of the card (FIG. 1B).

An integrated circuit 16 is mounted beneath a printed circuit board 18, which fits within a cutout in the card body. Contacts 20 cover one entire surface of the printed circuit board and the contacts are exposed to the outside of the card through the cutout, to provide electrical connection to the card. The size of the printed circuit board is exaggerated in the cross sectional views, e.g., FIG. 1C; it has the same lateral extent as the connector contacts 20, which cover one surface of the board.

A display element 22 is provided on the top surface of the card. In one implementation, transparent electrodes 24 (indium tin oxide or other substantially clear conductive material) are deposited on the interior surfaces of the top layer (best seen in FIG. 1C) and bottom layer. The electrodes may be configured to provide either a dot matrix pattern or a segmented display pattern. Z-axis conductor 28 (known polymeric material with conductivity only in the Z axis) provides conductive paths from the printed circuit board to the electrodes on the bottom layer. Contact with the electrodes on the top layer is via connections through the Z-axis conductor between the top and bottom layers (i.e., the bottom layer acts as a pass through for connections to the top layer, rather than having the printed circuit board be connected to both layers, thereby simplifying construction).

The electrodes work in conjunction with liquid crystal display (LCD) film 26, which is a bi-stable or multi-stable display material that will maintain an image when power has been removed. In this way, it is unnecessary for the chip card to have its own power source, or be connected to a power source, for the display to function. The preferred LCD material is a ferroelectric LCD. These LCDs are based on smectic liquid crystals typically of the smectic C phase with chiral behavior. When formed in a thin layer the ferroelectric material has a net polarization that is perpendicular to the viewing surface. The electrodes apply a field that rotates polarization between an "on" and an "off" state. Ferroelectric LCDs are typically sensitive to shock or bending, making them unsuitable for use in a chip card that can be bent (e.g., when stored in a wallet). To make the ferroelectric LCD less sensitive to bending, the ferroelectric liquid crystal (FLC) is fixed to a side-chain of the polymer used to create the LCD film (e.g., as taught in Japanese Pat. Document No. 63-318526) or where the FLC is dispersed in the polymer film (e.g., as taught in U.S. Pat. No. 5,638,194).

Other implementations can include different display elements such as suspended particle displays or field emission displays. These display elements, however, require a power source to display images.

Figure 10:
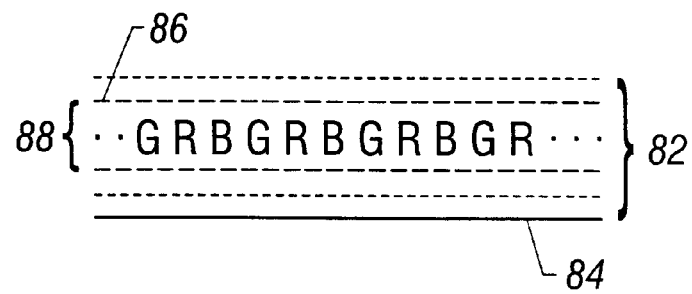
FIG. 10 shows a multi-color display.

Referring to FIG. 10, a filter layer 88 can add color to an otherwise monochromatic LCD display. The filter layer 88 may include color filters for red, green, and blue. A pixel 86 either blocks color filtered light or permits the color to illuminate a pixel 86. Though each pixel 86 only shows red, green, or blue, the viewer spatially integrates the colors to perceive combinations of the above colors (e.g., purple).

Figure 9:
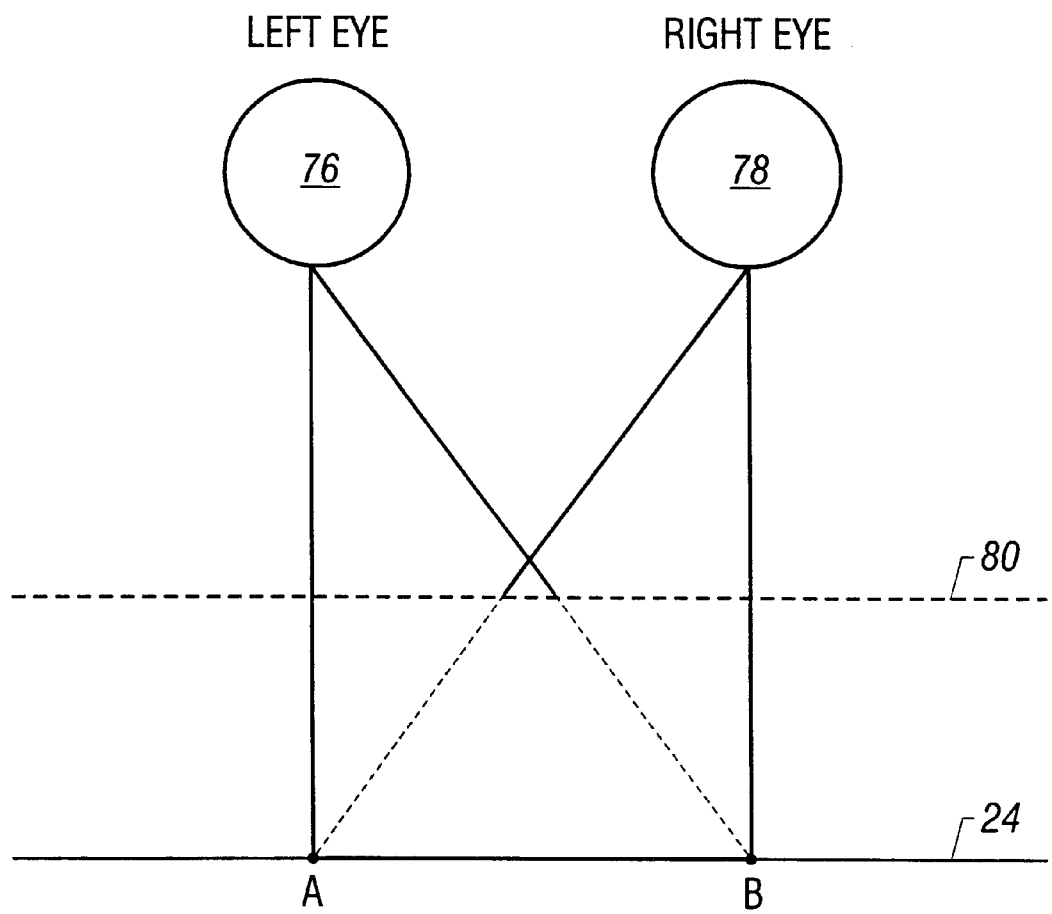
FIG. 9 shows a barrier strip layered over a display element layer to provide stereoscopic effects.

Referring to FIG. 9, the display can offer stereoscopic effects such as images that appear three-dimensional and images that alter their appearance based on viewing angle, (e.g., a face that winks as a viewer moves the card). For example, an LCD barrier strip 80 (described in U.S. Pat. No. 5,315,377 to Isono, incorporated by reference) intersperses vision blocking barrier regions with viewing regions to control the image perceived by a viewer. By choosing appropriate underlying LCD image, the barrier strip 80 alters image appearance. As shown in FIG. 9, left eye 76 sees point A, but not point B, while right eye 78 sees point B, but not point A.

The integrated circuit 16 includes a microprocessor for storing and processing information, and circuitry for powering and controlling the display element. In embodiments that store cash, the display can be configured as a dot matrix display. The display driving circuitry can use a multiplexed technique used in commercial passive displays to quickly refresh the display.

Figure 6:
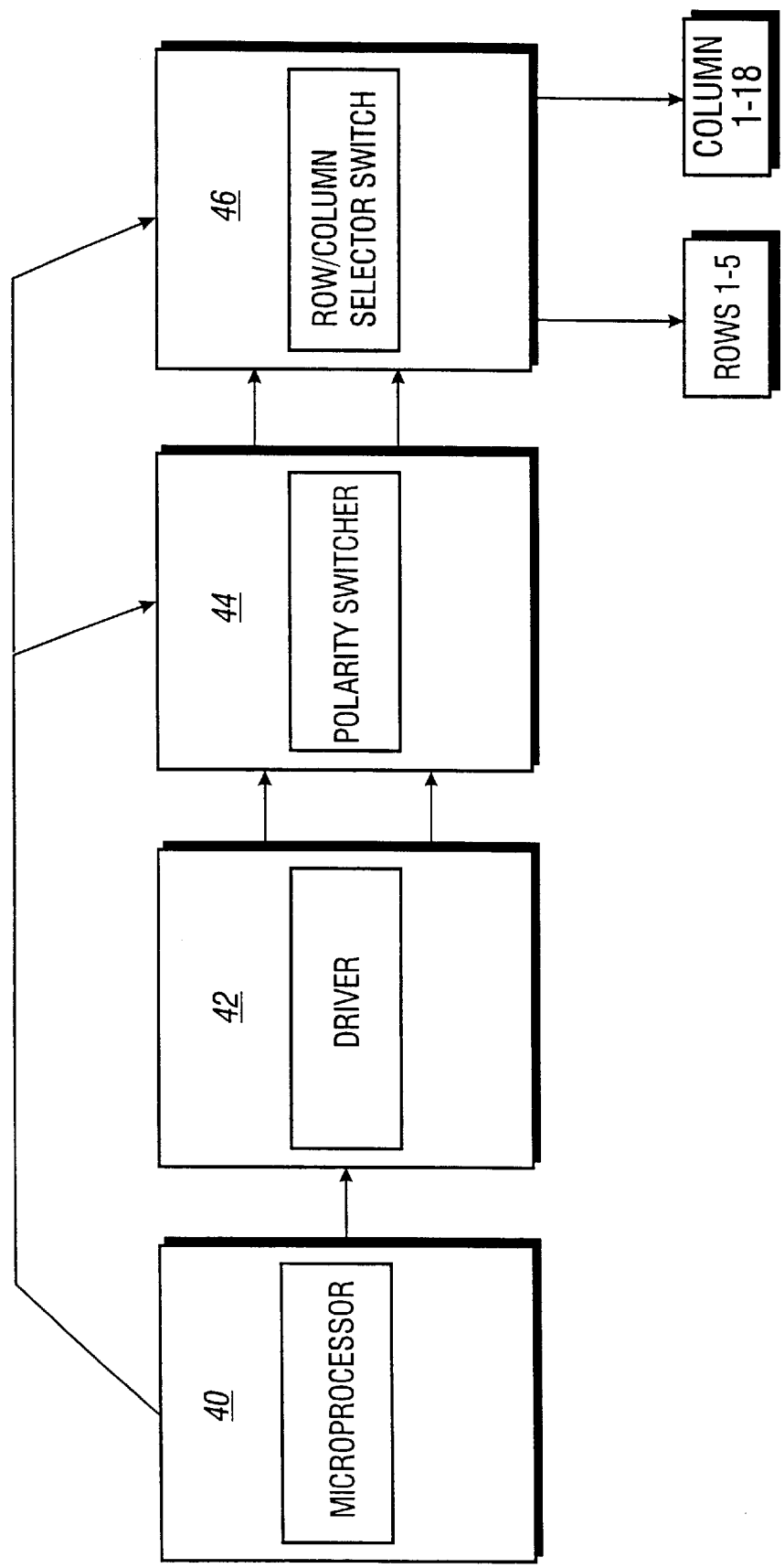
FIG. 6 shows the circuit block diagram for a chip card with a display element.

As shown in FIG. 6, the microprocessor 40 controls a driver circuit 42, which develops the voltages appropriate to activate and deactivate the display element pixels. A power source on the card or an external power source (e.g., a card reader) can provide the power needed by the microprocessor 40 and other stages. Polarity switch 44 at the output of the driver circuit selects whether the row or column electrode is to receive the positive polarity. Row/column selector switch determines which specific row/column pair receives the voltages produced by the polarity switch and driver circuit. Microprocessor 40 controls the driver circuit 42, polarity switch 44, and row/column selector switch 46.

The microprocessor 40 can also support multiple applications. Many smart cards support the Java programming language. Such applications may include compression/decompression applications that reduce the amount of information exchanged between the card and a card reader.

The assembled chip card may safely undergo flexing of the type and magnitude experienced by a card during normal use, handling, and storage (e.g., storage in a pocket, wallet, or purse)" by which is meant flexing the card through the following five tests with the card still functioning and with it not showing any cracked part (see ISO 7816-1, hereby incorporated by reference):

1. With the contacts facing up, bend the long side of the card through a deflection of 2 cm at a rate of 30 bendings per minute, for a total of 250 bendings.
2. With the contacts facing down, bend the long side of the card through a deflection of 2 cm at a rate of 30 bendings per minute, for a total of 250 bendings.
3. With the contacts facing up, bend the short side of the card through a deflection of 1 cm at a rate of 30 bendings per minute, for a total of 250 bendings.
4. With the contacts facing down, bend the short side of the card through a deflection of 1 cm at a rate of 30 bendings per minute, for a total of 250 bendings.
5. Place the card in a machine that applies torsion to its short sides, the maximum displacement being 15 degrees (plus or minus 1 degree) in alternative directions at a rate of 30 torsions per minute for a total of 1,000 torsions.

Alternatively, the assembled chip card may safely undergo "approximately 50% of the flexing of the type and magnitude experienced by a card during normal use, handling, and storage (e.g., storage in a pocket, wallet, or purse)" by which is meant bending and torsioning the card through the same five bending and torsion tests described above, but with 50% of the given amounts of deflection (1 and 0.5 cm instead of 2 and 1 cm) for the bending tests (1–4) and 33.3% of the given amount of angular displacement (5 degrees instead of 15 degrees) for the torsion tests (5), with the card still functioning and with it not showing any cracked part.

In performing the above tests, correct functioning of the card should be ascertained every 125 bends or torsions.

The display may not function perfectly, or at all, while the card is flexed into a curved shape, but once the card is allowed to assume its original shape the display will again function correctly. Contributing to this flexibility are the polymer substrates (top and bottom layers) and the z-axis conductor for making connections between the printed circuit board and the display. The z-axis conductor can withstand the variable compression that flexing produces.

Figure 2A:
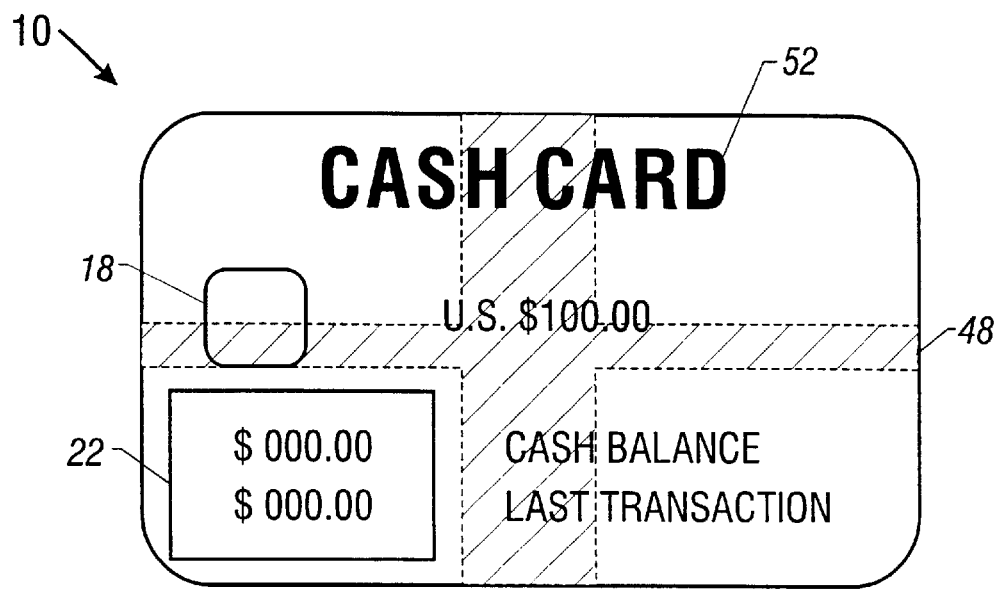
FIGS. 2A and 2B show a contact-type chip card with a flexible card body and a display element that is located anywhere outside of the cross-hatched area on the card.
Figure 2B:
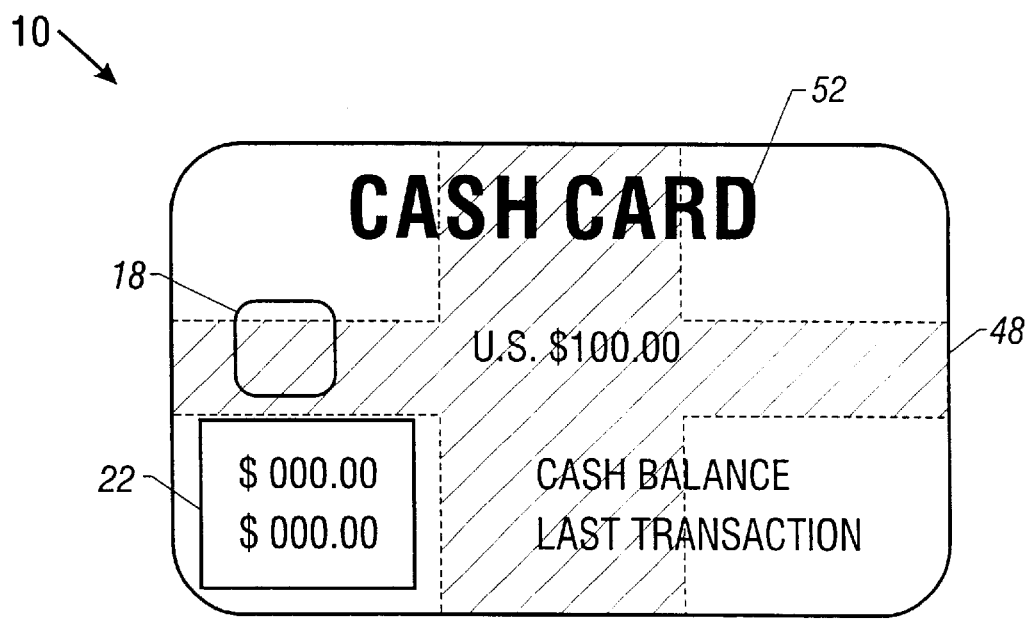

FIGS. 2A and 2B show a chip card in which the display element is made tolerant of flexing by being located in an area of the card that does not undergo substantial flexing. The display element is located at the corners of the card, outside of the cross-hatched areas in the figures. The cross-hatched area consists of a horizontal band and a vertical band. Preferably, as shown in FIG. 2A, the horizontal band is 6 millimeters wide, and the vertical band 15 millimeters wide. More preferably, as shown in FIG. 2B, the horizontal band is 11 millimeters wide, and the vertical band 30 millimeters wide. FIGS. 5B and 5C show a card featuring multiple display elements.

Figure 3:
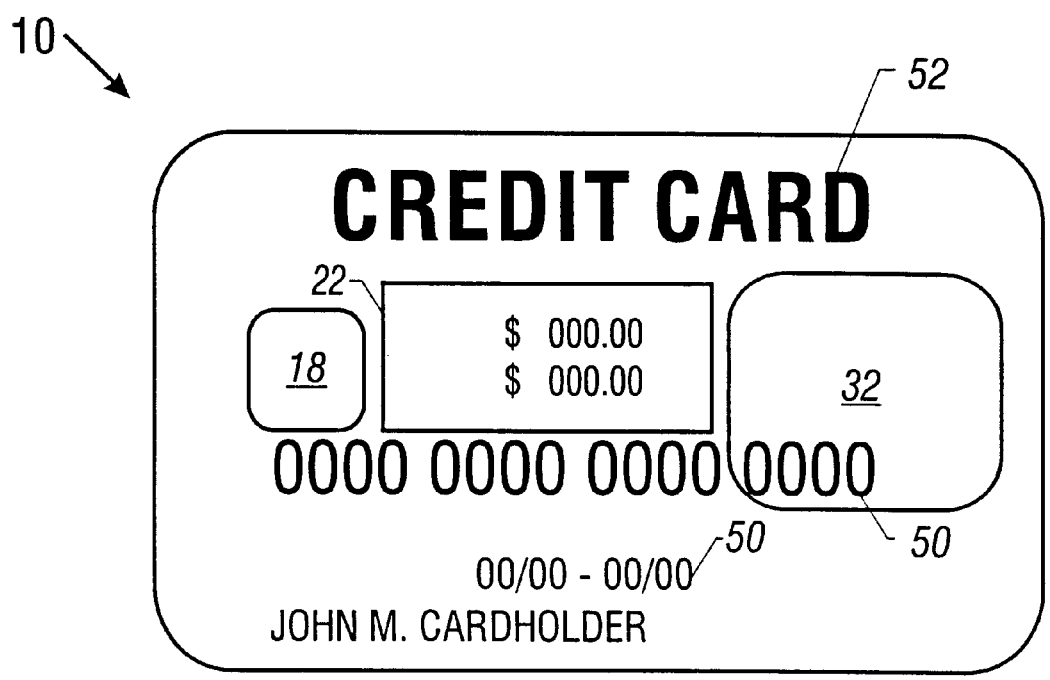
FIG. 3 shows a credit card with a contact-type chip and a flexible display element.

FIG. 3 shows a credit card 10 comprising a contact-type chip card with contacts 18 and flexible display element 22. Printed lettering 52 and embossed card numbers (and expiration date) 50 are included, as is a hologram 32.

Figure 4A:
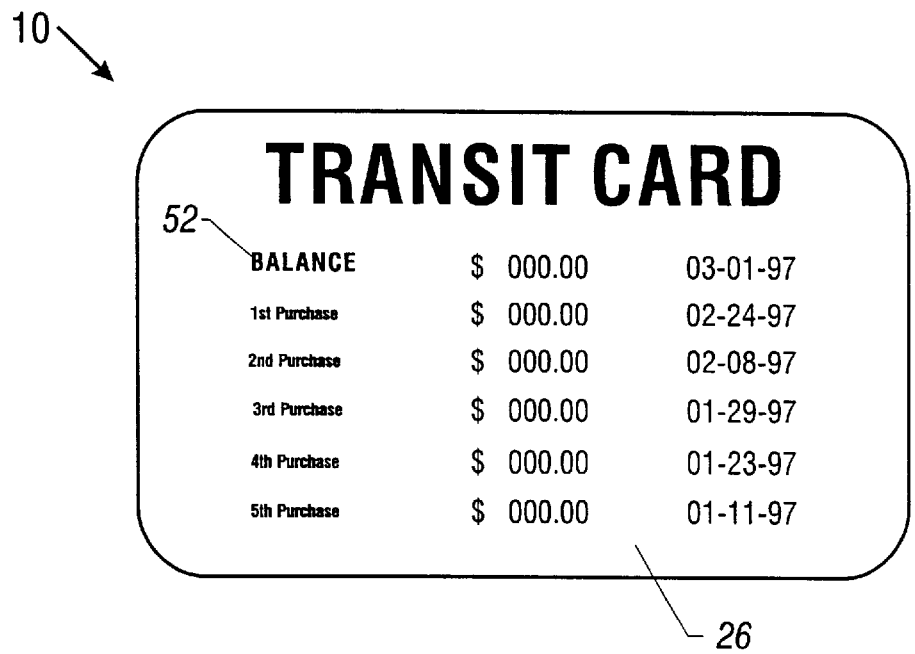
FIGS. 4A and 4B show a contactless chip card with a flexible display element that covers the entire surface of the card on one of the layers of the card.
Figure 4B:
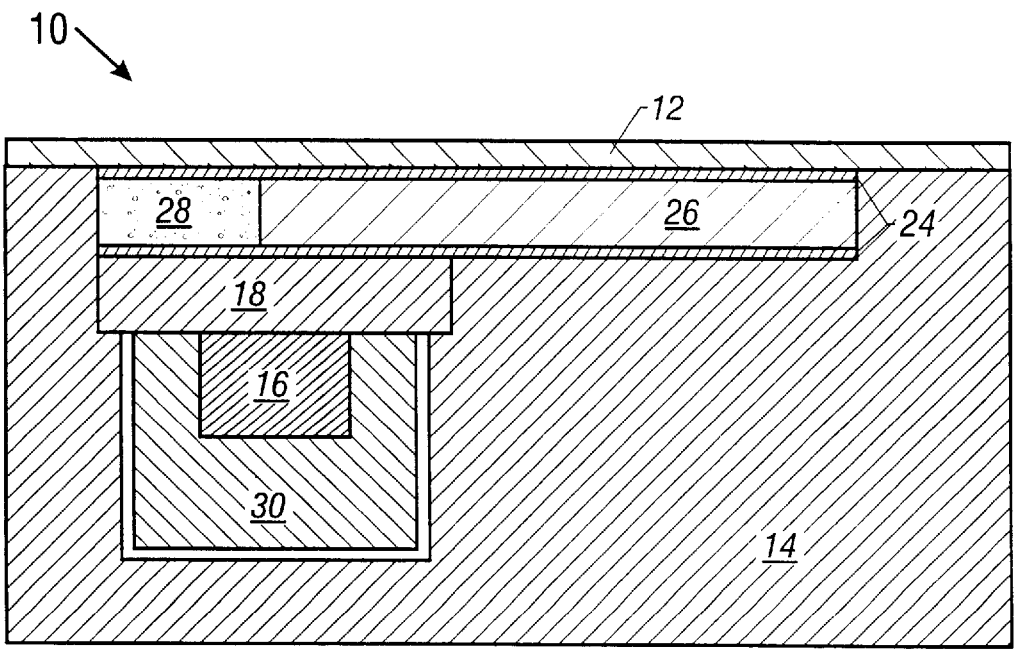

FIGS. 4A and 4B show a contactless chip card with a flexible display element covering substantially the entire surface of the card. A wireless communication element (not shown) is connected to printed circuit board 18. Z-axis conductor 28 connects the printed circuit board to the upper transparent electrodes of the display element. Lower transparent electrodes are connected directly to the printed circuit board. Some printed lettering 52 is used, but all of the lettering could be provided by the display.

Figure 5A:
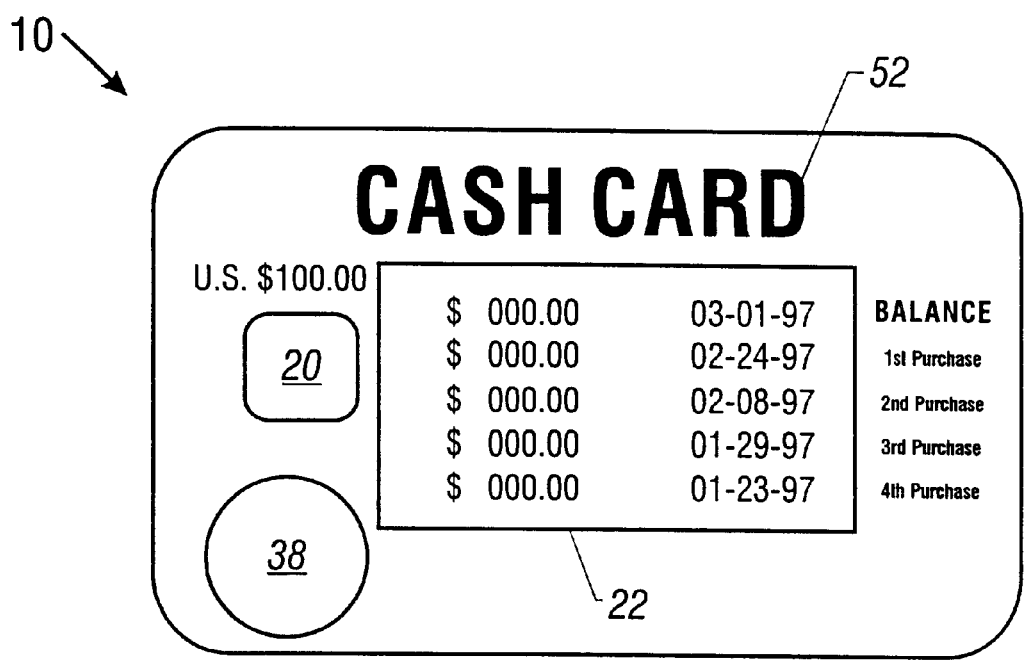
FIGS. 5A–5C show a chip card with a power source.
Figure 5B:
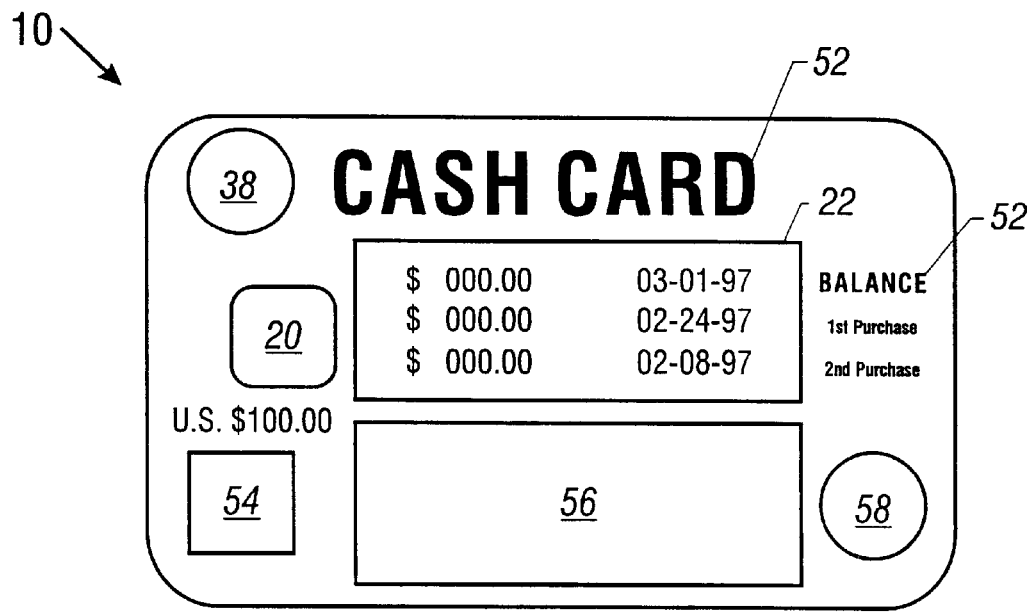
Figure 5C:
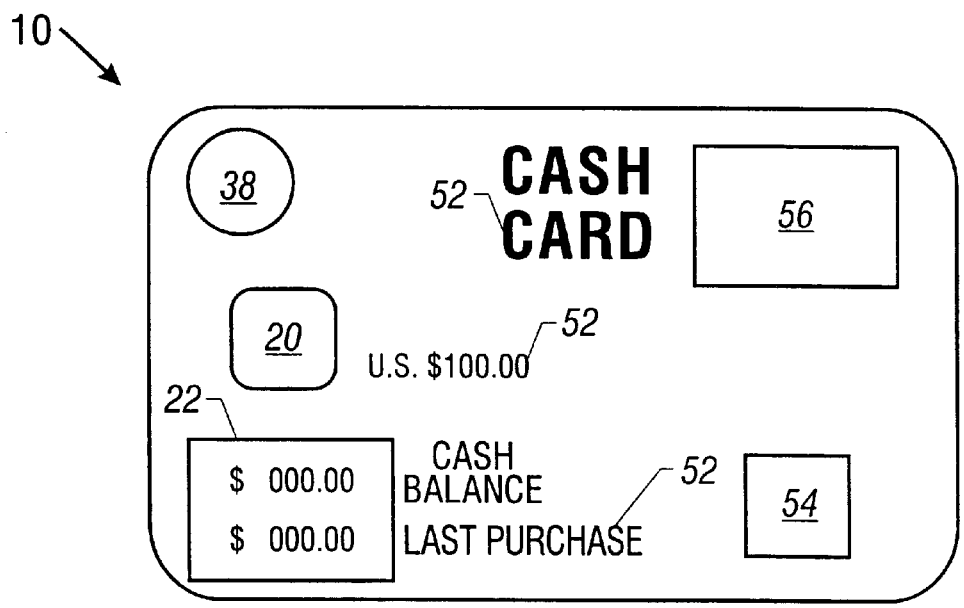

FIGS. 5A–5C show a chip card incorporating a power source (e.g., a battery or solar cell element) 38. The card may feature a small inflexible battery (e.g., a supercap) positioned in an area of the card that does not undergo substantial flexing, or, preferably, a flexible thin-film lithium battery, such as Oak Ridge National Laboratories' thin-film battery.

Inclusion of a power source 38 can enhance card functions with a variety of capabilities including multi-media. For example, in FIGS. 5B and 5C, the power source 38 drives a flexible speaker/microphone 54 that offers multiple-octave sound in a slim profile device (e.g., U.S. Pat. No. 5,115,472 to Park describes a flexible piezoelectric speaker/microphone made of polymer films, and is incorporated herein). Other types of speakers or microphones may be used that do not offer similar flexibility, but may nevertheless be positioned in an area of the card that does not undergo substantial flexing.

Addition of a power supply 38 can also produce animation sequences on the display element 22. By retrieving and displaying different sections of information stored in the semiconductor chip at successive time periods, the card can produce a series of images (e.g, a video clip or slide-show) on the display 22.

Figure 7:
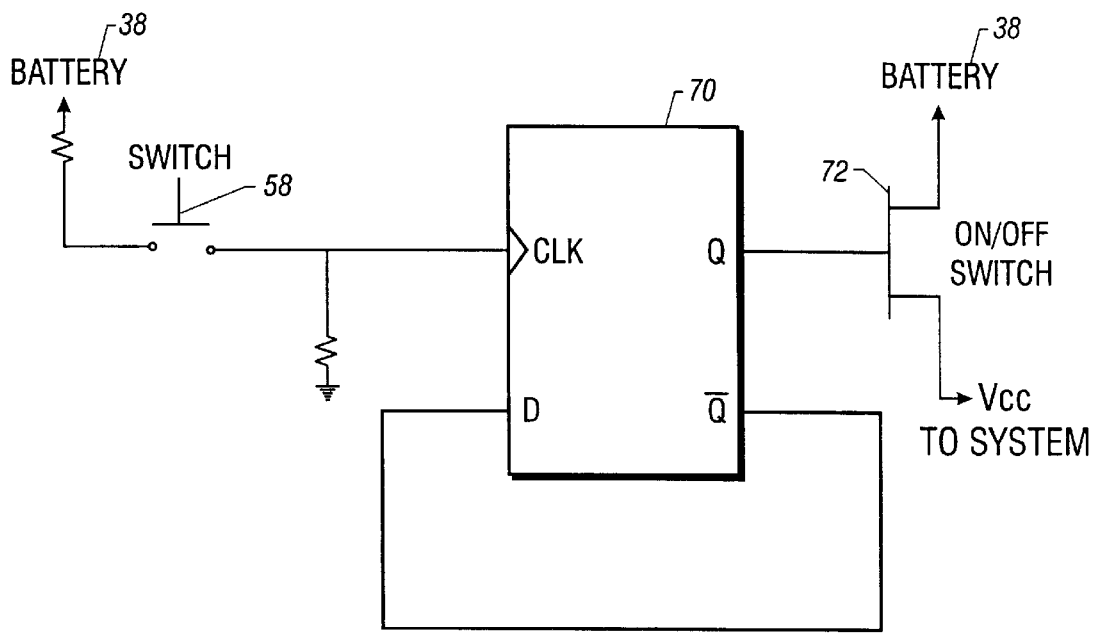
FIG. 7 shows a kickstart circuit that can control chip card power.

A card can provide several methods of controlling output from a power source 38 to conserve card energy. Referring to FIG. 7, the card can incorporate a kickstart circuit 70 (e.g., a flip-flop 70 that controls power source 38) connected to a user controlled contact area 58. Pressing the contact area 58 causes the kickstart circuit 70 to initiate power output from the power source 38. The kickstart circuit can provide power for a pre-determined time period or until a subsequent pressing of the contact area 58 as shown. In another implementation, the contact area 58 could instead merely connect otherwise disconnected wires to draw power from the power source 38. As mentioned, however, in the preferred embodiment, the display element does not need power to display a static image when the power source does not deliver power. The contact area 58 can control other card functions, for example, clearing the display element.

Figure 8:
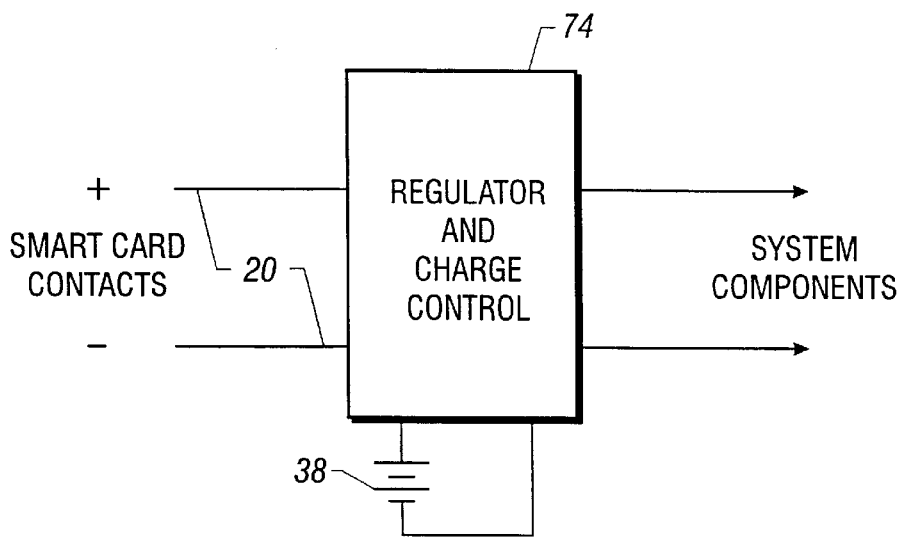
FIG. 8 shows a regulator and charge controller that can recharge a power source.

Both contact and contactless cards can use a power source 38. While both card types could use a card design that offers access to a power source 38 for simple replacement, each type of card may offer various recharge capabilities. For example, as shown in FIG. 8, a card could include a regulator charge control circuit 74 that accepts current and voltage from an external power source (e.g., a card reader) via contacts 20 for storage in a battery 38. A contactless card can recharge a power supply 38 from communication signals boosted to both transmit information and power.

Other embodiments of the invention are within the following claims. E.g., other materials could be used for the flexible top layer and substrate, and a co-processor could be included in the card.

What is claimed is:

1. A chip card for providing portable storage of information, the chip card comprising:

a flexible body;

at least one semiconductor chip supported within the flexible body and comprising a memory for storing at least some of the information;

at least one display element capable of displaying at least a portion of the information stored in the semiconductor chip, the display element being supported on or within the flexible body and comprising one or more display areas viewable from at least one side of the chip card;

the display element being capable of being flexed, without permanent damage, into the shape of the chip card in the vicinity of the display element when the chip card is placed in a machine that applies torsion to its short sides, the maximum displacement being 5 degrees (plus or minus 1 degree) in alternative directions.

2. A chip card for providing portable storage of information, the chip card comprising:

a flexible body;

at least one semiconductor chip supported within the flexible body and comprising a memory for storing at least some of the information;

at least one display element capable of displaying at least a portion of the information stored in the semiconductor chip, the display element being supported on or within the flexible body and comprising one or more display areas viewable from at least one side of the chip card;

the display element being capable of being flexed, without permanent damage, into the shape of the chip card in the vicinity of the display element when the chip card is placed in a machine that applies torsion to its short sides, the maximum displacement being 15 degrees (plus or minus 1 degree) in alternative directions.

3. The chip card of claim 1 or 2 wherein substantially all of the information on the display prior to said flexing continues to be displayed after said flexing.

* * * * *

UNITED STATES PATENT AND TRADEMARK OFFICE
CERTIFICATE OF CORRECTION

PATENT NO.      : 6,402,039 B1
DATED           : June 11, 2002
INVENTOR(S)     : David H. Freeman and Gary A. Freeman It is certified that error appears in the above-identified patent and that said Letters Patent is hereby corrected as shown below:

<u>Title page,</u>
Item [56], References Cited, U.S. PATENT DOCUMENTS, insert the following two patents:

-- 5,931,764 A     8/1999     Freeman et al. . . . . . . . . . .     482/4
   6,019,284 A     2/2000     Freeman et al. . . . . . . . . . .     235/380 --
OTHER PUBLICATIONS, the "Polymer-dispersed LCDs" reference, "stephan" should be -- stefan --.

<u>Column 3,</u>
Line 58, "CLAIMS" should be -- DRAWINGS --.

Signed and Sealed this

First Day of June, 2004

JON W. DUDAS
*Acting Director of the United States Patent and Trademark Office*